Figure 1:
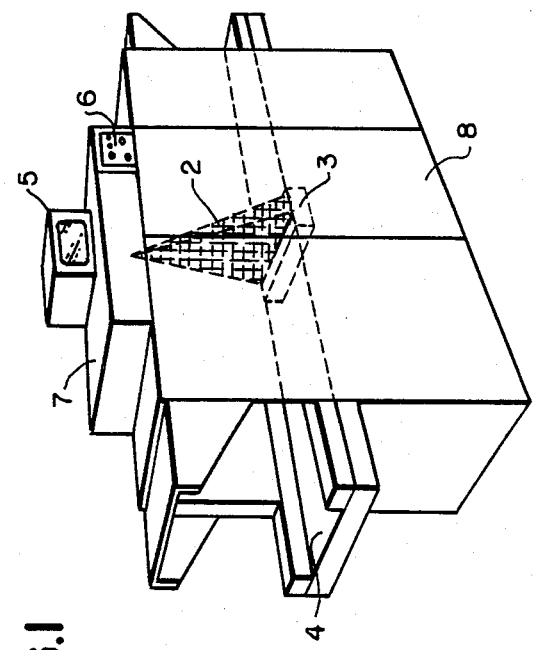

United States Patent [19]

Blaustein et al.

[11] Patent Number: 4,530,006
[45] Date of Patent: Jul. 16, 1985

[54] INTRINSIC OBJECT SENSING IN A DIGITAL FAN BEAM X-RAY INSPECTION SYSTEM

[75] Inventors: Aaron Blaustein, Oyster Bay; David J. Haas, Suffern, both of N.Y.; Francis R. Paolini, Stamford, Conn.

[73] Assignee: North American Philips Corporation, New York, N.Y.

[21] Appl. No.: 384,826

[22] Filed: Jun. 3, 1982

[51] Int. Cl.³ ............................................. H04N 5/32
[52] U.S. Cl. ..................................... 358/111; 378/14; 378/57; 378/99
[58] Field of Search ................... 358/111; 378/99, 14, 378/57, 95

[56] References Cited

U.S. PATENT DOCUMENTS

| | | | |
|---|---|---|---|
| 3,919,467 | 11/1975 | Peugeot | 378/57 |
| 3,924,064 | 12/1975 | Nomura et al. | 358/111 |
| 3,980,889 | 9/1976 | Haas et al. | 358/57 |
| 4,020,346 | 4/1977 | Dennis | 378/57 |
| 4,031,545 | 6/1977 | Stein et al. | 358/111 |
| 4,216,499 | 8/1980 | Kunze et al. | 378/57 |
| 4,239,969 | 12/1980 | Haas et al. | 378/57 |
| 4,352,986 | 10/1982 | Pfeiler | 378/14 |
| 4,366,382 | 12/1982 | Kotowski | 378/57 |
| 4,430,568 | 2/1984 | Yoshida et al. | 378/57 |

FOREIGN PATENT DOCUMENTS

| | | | |
|---|---|---|---|
| 1381202 | 1/1975 | United Kingdom | 358/111 |
| 1508909 | 4/1978 | United Kingdom | 378/57 |

Primary Examiner—John C. Martin
Assistant Examiner—Edward L. Coles
Attorney, Agent, or Firm—Paul R. Miller

[57] ABSTRACT

The present invention provides a digital system including circuitry for imaging items passing on a conveyor belt through an X-ray fan beam. The circuitry of the present invention enables detection of the items as soon as the X-ray beam is pierced and an image of the items is maintained on a monitor following removal of the items from the X-ray beam. This enables detection of all items entering the X-ray beam, and subsequent inspection of the items.

12 Claims, 3 Drawing Figures

INTRINSIC OBJECT SENSING IN A DIGITAL FAN BEAM X-RAY INSPECTION SYSTEM

The present invention involves a system for detecting the presence of an item on a conveyor belt in an X-ray inspection security system as soon as the item interrupts an X-ray beam. In particular, the present invention is designed to detect the instant the X-ray beam is interrupted, cause the X-ray image of the item to be viewed as it passes through the X-ray beam, and then maintain a completely formed image of the inspected item visible on a viewing screen for detailed viewing and evaluation after the item has passed through the X-ray beam.

In prior art security system operations, baggage is placed on a conveyor belt, and the conveyor and X-ray source are turned on so that the baggage moves into the X-ray beam.

Such security systems have employed optoelectronic devices to detect baggage and to initiate electronic processes such as scrolling. In such prior schemes, light is directed across the conveyor belt to a photosensor. Upon interruption by a piece of baggage, the baggage is detected. The problem with such schemes is that flat items or odd-shaped items do not interrupt the light. Thus, the prior art systems using optical devices to detect the presence of items on the conveyor miss very small items, oddly shaped items, and very narrow or thin items, such as wires or pencils, passing through detecting systems. Such items simply do not initiate the viewing process because they fail to interrupt the baggage detecting means.

The present invention provides a digital imaging system which uses the X-ray beam itself to detect the item on the conveyor belt. Digital imaging systems do not require any physical protrusions on the inside or outside of the enclosed tunnel through which baggage traverses, and the digital imaging system of the present invention enables viewing of the entire space in the enclosure from the conveyor belt to the roof of the enclosure by way of an X-ray fan beam and array of detector elements extending along the entire height or length of the beam.

This system of the present invention enables viewing of an image of all items passing through the X-ray inspection area upon the interruption of the X-ray beam by using a digital imaging system. A viewing monitor displays the X-ray image of the item passing through the X-ray beam at the instant the item interrupts the X-ray beam, and maintains a completely formed image of the inspected item on the monitor for detailed viewing and evaluation following the passing of the item from the X-ray beam.

The arrangement of the present invention involves an X-ray inspection system wherein a conveyor belt passes through an inspecting station having an X-ray fan beam arrangement. The fan beam is monitored by a multi-element detector array connected to a multiplexer and address generator. This digital system coordinated with an inspection system provides detection of the item as soon as it contacts the X-ray beam, maintains a monitoring of the item as it passes through the X-ray beam, and forms a complete image of the inspected item for detailed viewing and evaluation after the item has passed out of the X-ray beam.

X-ray detection systems utilizing an X-ray fan beam arrangement have been provided in the prior art, such as in the Schneeberger et al U.S. Pat. No. 3,808,444 and the patent to Roder U.S. Pat. No. 4,064,440. In these prior art arrangements, an X-ray fan beam is used and the luggage is detected on a conveyor belt by means of a plurality of photomultiplier type detectors, each of which is individually connected to detecting circuits for monitoring the device passing through the X-ray beam.

The present invention provides a digital imaging circuit in combination with a baggage detection circuit for viewing the item on the conveyor belt as it moves through the X-ray beam. Such a system further monitors an image of the inspected item after leaving the X-ray beam. This circuitry of the present invention provides a scroll signal to a scan converter circuit at the instant that the baggage moves into the X-ray beam. The scroll signal is stopped and the image frozen on the monitor for additional inspection the instant that the baggage leaves the X-ray beam.

Figure 3:
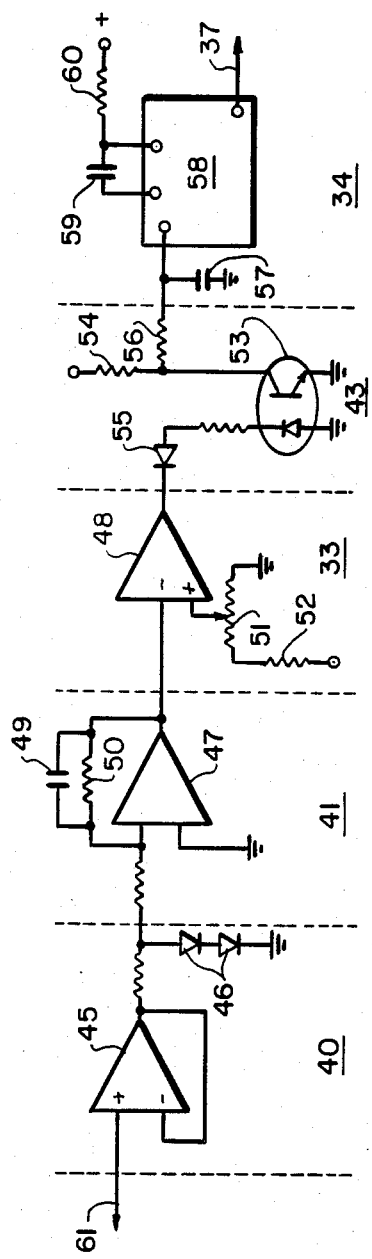
Figure 2:
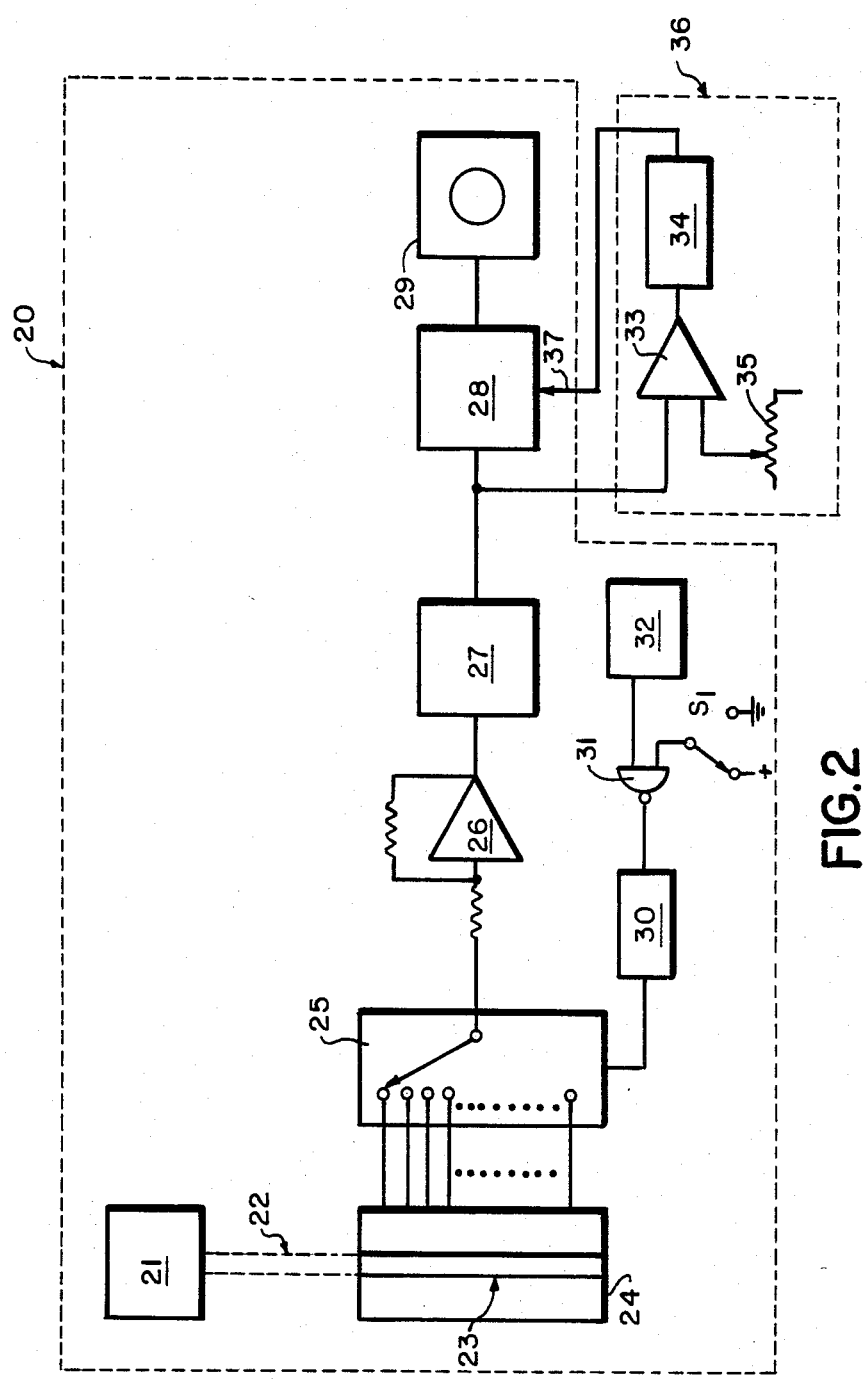

The various aspects and embodiments of the present invention are illustrated in the drawing figures which set forth the features of the present invention without limitation, and wherein:

FIG. 1 illustrates a vertical X-ray fan beam system for operation of the present invention, FIG. 2 provides an illustration of a circuit scheme for carrying out the aspects of the present invention, and FIG. 3 illustrates an expanded arrangement of the baggage detection circuitry of the present invention.

The present invention may be seen more fully by referring to the drawing figures in which FIG. 1 illustrates a vertical X-ray fan beam system 1 wherein an X-ray fan beam 2 is projected onto an item moving on a conveyor 4 to be detected by the multi-element detector array 3. The X-ray beam 2 is generated through an X-ray generator 7. The various components in the multi-element detector array 3 and corresponding multiplexer 25, as seen in FIG. 2, may be accessed through a panel 8. The system 1 may be controlled through a control panel 6, and the items passing on the conveyor 4 may be viewed by way of a TV monitor 5.

In FIG. 2 the simplified block diagram arrangement of the present invention is illustrated in which the digital imaging system 20 includes the X-ray generator 21 providing a collimated narrow X-ray beam or fan beam 22 which is detected by the multiple detector elements 23. As many as approximately 500 of these detector elements are provided in line in a multi-element detector array 24 to essentially provide a linear viewing arrangement, such as the horizontal array 3 illustrated in FIG. 1 for the vertical X-ray fan beam 2.

The multiple detector elements 23 are respectively connected to the multiplexer 25 having outputs sequentially fed to a video amplifier 26, an autocorrection circuit 27, a scan converter 28, and a scope monitor 29. The operation of the scan converter 28 is controlled by a baggage detection system 36 including a comparator 33 and a retriggerable one-shot multivibrator 34 providing a scroll command signal 37 to the scan converter 28. The comparator 33 is controlled through a threshold adjustment circuit 35, and receives an input from the digital imaging system 20.

A clock 32 supplies pulses to the digital circuitry including the multiplexer 25 through a switching circuit 31 and an address generator 30. The switching circuit 31 includes the switch S1 alternatively providing stand-by and operation conditions.

When the switch S1 is in the operational position, the clock 32 supplies pulses through the address generator 30 to the multiplexer 25 which steps the multiplexer sequentially to every detector element 23. In normal performance, the automatic correction circuit 27 has previously been operationally adjusted in its output so that every detector 23 of the multi-element detector array 24 produces a one volt video output when no interference is present, i.e. no items of baggage, in the X-ray beam 22 between the generator 21 and the detector elements 23.

The threshold level of the baggage detection system is preset from the threshold adjusting circuit 35 so that the one volt level appearing at the input of the non-inverting comparator 33 does not produce a trigger signal for the retriggerable one-shot multivibrator 34. Any interruption of the beam lowers the output of the detector elements 23 so that repetitive signals containing values lower than one volt are fed to the comparator circuit 33. The preset threshold level overcomes the non-inverter signal input signal of the comparator 33 at these lowered voltage levels, resulting in a comparator output triggering the one-shot multivibrator 34 to produce the scroll command 37.

Since this triggered signal appears continually as long as the X-ray beam is blocked, the scan converter 28 sees a continuous scroll command and the image of the object interrupting the X-ray beam appears on the monitor 29 to move across the monitor screen. When the object leaves the X-ray area or X-ray beam 22, the scrolling signal 37 ends thereby retaining a complete image of the object on the monitor 29.

The baggage detection system 36 may be seen in further detail in FIG. 3 as including a buffer follower circuit 40 with amplifier circuit 45, a discriminator circuit 41 with amplifier circuit 47, the comparator 33 with amplifier 48, a level converter 43, and the retriggerable one-shot multivibrator 34 providing the scroll command output signals 37. The buffer follower amplifier 45 is provided with an input signal 61 from the video output of the digital imaging system 20.

This arrangement of the baggage detection system enables a carrying out of the circuit control for signals from the multiplexer 25 in order to allow viewing on the monitor 29. That is, the scroll command signal 37 makes the scan converter 28 operational to produce an image on the monitor 29 so that an image of the baggage moving through the X-ray beam 22 is produced. The image is stored in a memory circuit of the scan converter 28. The scroll command signal 37 is produced at the instant that the baggage moves into the X-ray beam 22. Further, the circuitry enables the scroll command signal 37 to be stopped as the baggage moves out of the X-ray fan beam 22 so that the image on the monitor is frozen for additional inspection.

While several embodiments of the present invention have been illustrated and described, these particularly described arrangements do not limit the present invention. The X-ray fan beam system may be arranged to be horizontal, for example, with a vertical arrangement of the detector array. All structures, techniques, arrangements, and embodiments of the present invention which are evident from the present claims are included in this invention.

What we claim:

1. An object sensing device comprising an electromagnetic fan beam, conveyor means for passing objects through said fan beam, a linear array of detector elements arranged to pick-up changes in intensity of said fan beam caused by said objects, multiplexing means for sequentially sampling said plurality of detector elements, first circuit means receiving signals from said multiplexing means for imaging said objects, and second circuit means forming control signals for controlling said first circuit means during and after passage of said objects through said fan beam, wherein said second circuit means includes a retriggerable one-shot multivibrator circuit.

2. An object sensing device according to claim 1, wherein said electromagnetic fan beam is penetrating radiation such as an X-ray fan beam.

3. An object sensing device according to claim 2, wherein said X-ray fan beam is vertical or horizontal.

4. An object sensing device according to claim 1, wherein said second circuit means includes an electronic circuit for producing said control signals.

5. An object sensing device according to claim 1, wherein said linear array of detector elements include a multiple number of detector elements provided in a line corresponding to said fan beam.

6. An object sensing device according to claim 5, wherein approximately 500 detector elements are provided in said linear array.

7. An X-ray optical sensing device for inspecting objects of varying sizes and shapes, said device comprising
first means for producing an X-ray fan beam,
conveyor means for passing said objects through said X-ray fan beam,
a linear array of detector elements arranged to convert changes in intensity of said fan beam caused by said objects passing through said X-ray beam into electrical signals,
multiplexing means receiving said electrical signals for sequentially sampling said detector elements and producing output signals,
first circuit means receiving said output signals for imaging said objects, and
second circuit means for controlling said first circuit means, said second circuit means including threshold circuit means for providing a command signal to said first circuit means, said command signal being formed upon said objects passing through said X-ray fan beam, wherein an image of said objects can be maintained after said objects pass through said X-ray beam.

8. An X-ray optical sensing device according to claim 7, wherein said first circuit means includes a monitor for imaging said objects.

9. An X-ray optical sensing device according to claim 7, where said second circuit means includes a buffer follower circuit, a discriminator circuit, a comparator circuit, a level converter circuit, and a retriggerable multivibrator circuit for providing said command signal.

10. An X-ray optical sensing device according to claim 7, wherein said first circuit means includes a scan converter circuit having a memory circuit, said memory circuit storing said image of said objects to maintain said image of said objects after said objects pass said X-ray beam.

11. An X-ray optical sensing device according to claim 7, wherein said linear array of detector elements include a multiple number of detector elements provided in a line corresponding to said fan beam.

12. An X-ray optical sensing device according to claim 11, wherein approximately 500 detector elements are provided in said linear array.

* * * * *